United States Patent [19]

Clark

[11] Patent Number: 4,731,146

[45] Date of Patent: Mar. 15, 1988

[54] ADHESION PROMOTING PRIMER ACTIVATOR FOR ANAEROBIC COMPOSITIONS

[75] Inventor: Paul J. Clark, West Simsbury, Conn.

[73] Assignee: Loctite Corporation, Newington, Conn.

[21] Appl. No.: 771,391

[22] Filed: Aug. 30, 1985

[51] Int. Cl.$^4$ .............................. C09J 5/04; B32B 5/06; C08F 30/04

[52] U.S. Cl. .................................. 156/314; 156/319; 427/302; 526/240

[58] Field of Search ................ 427/302; 156/314, 319; 526/240

[56] References Cited

U.S. PATENT DOCUMENTS 4,322,509 3/1982 Zalucha .............................. 525/287
4,446,246 5/1984 McGinniss .......................... 525/384

FOREIGN PATENT DOCUMENTS 53-113843 10/1978 Japan .

*Primary Examiner*—Joseph L. Schofer
*Assistant Examiner*—Peter F. Kulkosky
*Attorney, Agent, or Firm*—Vidas & Arrett

[57] ABSTRACT

A composition useful as an adhesion promoting primer activator for curable acrylic monomer formulations, particularly anaerobic curable formulations, comprises a solution in a volatile organic solvent of a Cu(II), Co(II), Mn(II), Mn(III), or Cr(III) salt of an acid phosphate acrylic monomer. The acid phosphate monomer may be one of the formula:

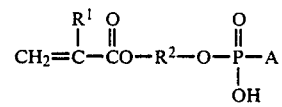

where $R^1$ is H or methyl, $R^2$ is a divalent organic group having 2–40 carbon atoms and A is OH or $CH_2=C(R^1)C(=O)OR^2O$.

9 Claims, No Drawings

ADHESION PROMOTING PRIMER ACTIVATOR FOR ANAEROBIC COMPOSITIONS

BACKGROUND OF THE INVENTION

Acid phosphate (meth)acrylic monomers, that is compounds with acrylate or methacrylate functionality and

functionality have recently become known as adhesion promoting additives for curable acrylic monomer adhesives and coatings. Such compounds have been observed to improve adhesion in formulations for bonding dental and bone materials as well as a variety of metals. They are especially useful on metals such as zinc and aluminum which give poor results with other adhesion promoters such as acrylic acid and acrylic ester acids like those disclosed in U.S. Pat. Nos. 4,431,787 and 4,048,259.

References which describe such acid phosphate monomers and compositions thereof include U.S. Pat. Nos. 3,754,972; 3,987,127; 4,044,044; 4,250,007; 4,223,115; 4,293,665; 4,322,509; 4,452,944; 4,433,124; 4,434,278; 4,259,117; 4,368,043; 4,499,251; 4,525,493; and 4,515,930. Other such references include Jpn No. Kokai 57/167364 (1982); Jpn No. Kokai 49/20238 (1974); Jpn No. Kokai 49/84964 (1984), see Chem. Abst, 101: 153164k; Jpn No. Kokai 56/100803 (1981), see Chem./Abst, 95: 221461q; and European Pat. Nos. EP0058483 and EP0074708.

Phosphate compounds, however, have long been known as stabilizers for acrylic monomer compositions and it has been observed that acid phosphate monomers do have a cure inhibiting or slowing effect on compositions to which they are added. See e.g. U.S. Pat. No. 4,322,509.

In Jpn No. Kokai 78/113843 (1978) there are described dental adhesive compositions which employ partially neutralized phosphate monomers in which about 30-90% of the phosphoric acid groups are converted to metal, ammonium or amine salts. Suggested for improved adhesion are the partial salts of "alkali earth metals as magesium, calcium, and barium, elements which belong to the copper and zinc families, such transition elements as titanium, vanadium, chromium, manganese, iron, cobalt, nickel and zirconium." The only examples, however, are calcium salts. This reference teaches that adhesion improvement decreases after 50% of the phosphoric acid groups are neutralized and falls off considerably when more than 90% of the acid groups are neutralized.

In U.S. Pat. No. 4,446,246 there are described two-part acrylic monomer adhesive compositions, one part of which includes an acrylic monomer-oligomer base and a Cu(I) complex. One such complex is said to be prepared from $CuCl_2.2H_2O$ and bis(methacryloxy ethyl) phosphate.

Solutions of transition metal salts, particularly copper salts of organic acids in organic solvents have frequently been used as primer accelerators for curable acrylic monomer compositions, particularly anaerobic curing adhesives or sealants. However, the use of such primers frequently results in significant reductions in ultimate cure strength. Nevertheless, because of their advantages in accelerating cure and because, on some substrates, cure of anaerobic compositions cannot be obtained without addition of transition metal salt ion, such primers are widely used.

While the acid phosphate monomers have achieved wide investigation in the art as evidenced by the foregoing discussion, such compounds have found only limited application in room temperature curing anaerobic acrylic compositions because of their substantial cure inhibiting effects.

SUMMARY OF THE INVENTION

The invention pertains to a novel activating primer for anaerobic and other acrylic adhesives, sealants or coatings and to a method of bonding substrates with an anaerobic adhesive which employs the inventive primer. The primer comprises a solution in a volatile organic solvent of a salt selected from Cu(II), Co(II), Mn(II), Mn(III), and Cr(III) salts, of and acid phosphate monomer having acrylic or methacrylic functionality. Preferably the salt is a Cu(II), Co(II) or Cr(III) salt. Most preferably, the salt is a Cu(II) salt. Suitably, the acid phosphate monomer is reacted stoichiometrically so that no excess phosphate acid functionality remains. These primers give both much improved adhesion when used with formulations normally employing a traditional transition metal carboxylate primer and cure activation which is only slightly reduced, if at all, compared to such metal carboxylate primers. Surprisingly the Cu(II) salts, which give the greatest activation of room temperature anaerobic cure, also appear to be the most storage stable as well.

DETAILED DESCRIPTION OF THE INVENTION

Anaerobic compositions are well known to those skilled in the art and formulation information need not be recited herein in detail. Typically, they contain (meth)acrylic functional monomers, or prepolymers with acrylate or methacrylate ester groups, especially poly(meth)acrylic functional monomers; organic hydroperoxy or perester initiators; accelerators such as saccharin and/or dimethyl-p-toluidine; and stabilizers, such as hydroquinone or other phenolic stabilizers and metal chelators such as sodium EDTA or phosphonate compounds such as Dequest ® 2010 sold by Monsanto Industrial Chemicals Co. Anaerobic curing compositions are formulated such that they are air stabilized but readily polymerized in the absence of oxygen. Usually they are formulated to polymerize within a few minutes to about 24 hours at or near room temperature.

Most, if not all, anaerobic cure systems require transition metal catalysis. With iron or copper substrates, such catalysis is provided by the substrate itself. For other types of systems, or where accelerated curing is desired, primers which supply transition metal usually Cu(II) salts are routinely used. Typically such primers are solutions in a volatile or organic solvent of a Cu(II) carboxylate salt or Cu(II) complex such as copper(II) 2-ethylhexanoate or copper(II) acetylacetonate. Minor amounts of other compounds such as organic amines or excess organic acid may also be included in such primer compositions. A representative of such primer is Loctite Primer N, a trademarked product of Loctite Corporation, Newington, CT. U.S.A. In normal use, the primer is applied to one or both surfaces of a substrate to be bonded and the solvent allowed to evaporate after which, the adhesive is applied and the substrates joined until bonded.

The inventive primers are distinguished by the fact that the transition metal ion is supplied as a salt of an acid phosphate monomer as that term has been described above. Most preferably, the acid phosphate monomers have the formula

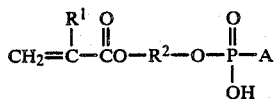

where $R^1$ is H or methyl, $R^2$ is a divalent organic residue having from 2–40 carbon atoms and A is OH or $H_2C=C(R^1)-COOR^2O-$. Suitably, $R^2$ is $C_2-C_{10}$ alkylene. Examples of commercially available materials include mono(methacryloxyethyl)phosphate; bis(methacryloxyethyl)phosphate; mono(acryloxyethyl)phosphate; bis(acryloxyethyl)phosphate; mixed mono and bis(acryloxyhexyl)phospate and mixed mono and bis (methacryloxyhexyl)phosphate.

It has been found that it is generally not suitable to prepare the primer salts from a solution of an organic metal salt in water. If product is obtained from aqueous reaction it has been found that it cannot subsequently be redissolved in a suitable organic solvent. Without being bound thereto it is hypothesized that residual water of hydration may be involved in this problem.

The preferred means for preparing the inventive primers is to add a suitable acid phosphate monomer to a solution in the desired organic solvent of a metal carboxylate salt or a metal diketone complex such as copper acetylacetonate. The reaction of the phosphate acid monomer has been observed to be essentially quantitative by infrared spectrophotometry. The resulting carboxylic acid or diketone need not be removed from the mixture as it does not appear to substantially interfere with the activity and efficacy of the primer composition.

The carboxylate salts may advantageously be mono, di, or poly carboxylates having between two and about twenty-five carbon atoms, such as acetic, propanoic, maleic, sebasic, azelaic, benzoic, phthalic, (meth)acrylic, etc. However, as molecular weight of the carboxylic acid increases, adhesion strength will be expected to be reduced because of the lubricating properties and non-volatility of long carbon chain acids. Preferred carboxylates are $C_5-C_{12}$ aliphatic hydrocarbyl carboxylates. Usefull metal complexes are metal ion complexes with organic ligand groups, less acidic than the acid phosphate monomer, which are free of nitrogen atoms. Suitable complex ligands are beta-diketones such as acetylacetone and dibenzoylmethane. Beta-ketoesters, such as ethyl acetoacetate and phenolic compounds also may be used as ligand groups.

The organic solvents are preferably halocarbon solvents such as 1,1,1-trichloroethane, dichloromethane or chlorofluorocarbon solvents because of their volatility and relative non-flammability. Other common organic solvents may also be used, however, such as acetone, methyl ethyl ketone, ethyl acetate, toluene, and xylene.

Preparation and use of the inventive primers are illustrated by the following non-limiting examples.

EXAMPLES

The following abreviations are used in the examples below:

PM-1: mono(methacryloxyethyl)phosphate;
PM-2: bis(methacryloxyethyl)phosphate;
PM-21: mixture of mono and bis(methacryloxyhexyl) phosphates;
PA-21: mixture of mono and bis(acryloxyhexyl) phosphates;
AA: Acrylic acid;
B-CEA: 3-acryloxypropanoic acid;
2-SEM: 2-sulfoethyl methacrylate;
BPA: benzene phosphonic acid;
PPA: phosphonopropanoic acid.

Unless otherwise specified, the adhesive used in the following examples is an anaerobic adhesive having the following formulation:

| Ingredient | Parts by Weight |
| --- | --- |
| Hydroxy alkyl methacrylates | 155 |
| Methacrylate terminated polyether diol/bisphenol A Urethane block resin | 244 |
| Isobornyl methacrylate | 75 |
| Polyethylene glycol dimethacrylate | 1.5 |
| Acetylphenylhydrazine | 2.5 |
| Saccharin | 2.5 |
| Cumene hydroperoxide | 5.1 |
| Water | 1.5 |
| Ethylene glycol | 1.7 |
| Benzoquinone | 0.1 |
| 1,1-hydroxyethylidene-1,1-diphosphonic acid | 0.2 |
| 2,2'-[ethylenebis(nitrilomethylidene) dipyridine] | 0.005 |

EXAMPLE 1

Primer formulations were prepared by adding approximately stoichiometric amounts of an acid phosphate monomer to a solution of copper(II)acetylacetonate [Cu(AcAc)$_2$] in dichloromethane (0.0125M). Steel lap shear specimens (¾″ overlap) were prepared by applying the resulting primer solution to each steel coupon, allowing the solvent to evaporate, applying the adhesive, joining the two coupons and clamping for 48 hours. A control primer, containing only the Cu(AcAc)$_2$ soln., was also used. Tensile shear values were then determined as indicated in Table I. Values are avg. of 3 samples except control where only the highest value is shown.

TABLE I

| Primer | Tensile Shear Strength (psi) |
| --- | --- |
| Cu(AcAc)$_2$ + PM-21 | 2600 |
| Cu(AcAc)$_2$ + PA-21 | 2200 |
| Cu(AcAc)$_2$ + PM-2 | 2600 |
| Control - Cu(AcAc)$_2$ | 1100 |

EXAMPLE 2

Primers were prepared and utilized with the adhesive on galvanized steel, steel and aluminum lap shear coupons as in Example 1, except that the added acids were as indicated in Table II and the cure time was 24 hours at room temperature. Results shown in Table II are averages of three samples.

TABLE II

COMPARISON OF SEVERAL ORGANOPHOSPHOROUS ACID COMPOUNDS AS ADHESION PROMOTERS

| PRIMER | TENSILE SHEAR STRENGTH (psi) | | |
|---|---|---|---|
| | GALVANIZED | STEEL (AR) | ALUMINUM (AR) |
| Cu(AcAc)$_2$ | 400 | 800 | 800 |
| Cu(AcAc)$_2$ + PM-1 | 800 | 2900 | 1900 |
| Cu(AcAc)$_2$ + BPA | 400 | 1100 | 500 |
| Cu(AcAc)$_2$ + PPA | 400 | 1200 | 1000 |

EXAMPLE 3

The procedures of Example 2 were repeated except that the acids utilized in the primers were as indicated in Table III. Results given in Table III are averages of 3 values.

TABLE III

COMPARISON OF SEVERAL POLYMERIZABLE ADHESION PROMOTERS

| PRIMER | TENSILE SHEAR STRENGTH (psi) | | |
|---|---|---|---|
| | GALVANIZED | STEEL (AR) | ALUMINUM (AR) |
| Cu(AcAc)$_2$ | 400 | 900 | 800 |
| Cu(AcAc)$_2$ + AA | 600 | 1700 | 1400 |
| Cu(AcAc)$_2$ + B-CEA | 900 | 2800 | 1900 |
| Cu(AcAc)$_2$ + PM-1 | 2000 | 3200 | 2000 |
| Cu(AcAc)$_2$ + 2-SEM | 400 | 1700 | 400 |

EXAMPLE 4

Primers were prepared from 0.0125M solns in dichloromethane of various metal acetylacetonates, with and without added stoichiometric amounts of bis methacryloxyethyl phosphate. Galvanized, Steel and Aluminum coupons were bonded as in Example 1 except a 24 hour RT cure was used. Results shown in Table IV are averages of 3 samples.

TABLE IV

COMPARISON OF PERFORMANCE OF VARIOUS METAL ION/PM-2 SPECIES AS PRIMER/ACTIVATORS

| PRIMER | TENSILE SHEAR STRENGTH (psi) | | |
|---|---|---|---|
| | GALVANIZED | STEEL (AR) | ALUMINUM (AR) |
| Al(AcAc)$_3$ | 600 | 1600 | 1100 |
| Al(AcAc)$_3$ + PM-2 | 1000 | 2200 | 1300 |
| Co(AcAc)$_2$ | 600 | 1200 | 1100 |
| Co(AcAc)$_2$ + PM2 | 1400 | 2700 | 1300 |
| Cr(AcAc)$_3$ | 600 | 1500 | 1100 |
| Cr(AcAc)$_3$ + PM-2 | 1600 | 3100 | 1600 |
| Mn(AcAc)$_2$ | 500 | 1100 | 1000 |
| Mn(AcAc)$_2$ + PM-2* | 1300 | 2900 | 1400 |
| Mn(AcAc)$_3$ | 400 | 800 | 1200 |
| Mn(AcAc)$_3$ + PM-2 | 600 | 2600 | 1100 |
| Na(AcAc) | 600 | 1800 | 900 |
| Na(AcAc) + PM-2 | 900 | 2000 | 1100 |
| Zr(AcAc)$_4$ | 500 | 1600 | 1000 |
| Zr(AcAc)$_4$ + PM-2 | 1000 | 1300 | 1300 |
| Fe(AcAc)$_3$ | 900 | 1200 | 1400 |
| Fe(AcAc)$_3$ + PM-2 | 800 | 2100 | 1700 |
| Cu(AcAc)$_2$ | 300 | 400 | 1100 |
| Cu(AcAc)$_2$ + PM-2 | 1500 | 3700 | 3200 |
| Cu(AcAc)$_2$ + BPA | 300 | 600 | 600 |

*gelled on standing

EXAMPLE 5

In accordance with the teachings of Jpn No. Kokai 78/113843, 20% mixtures of PM-1 in water were neutralized by addition of 54% of stoichiometric and a stoichiometric excess of CaCO$_3$ and the dried ppt collected after washing with water and methanol. In a similar manner, CuCO$_3$.Cu(OH)$_2$ was used to neutralize aqueous PM-1 mixtures. The respective ppts were stirred in various organic solvents, including methanol, acetone, benzene, dichloromethane and 1,1,1,-trichloroethane without apparent dissolution.

Approximately 0.15 g of the respective final divided ppts were stirred for ½ hour in trichloroethane and then allowed to settle. The liquid was used as a primer for bonding steel coupons with the anaerobic adhesive as in Example 1. For all three primers, the average tensile shear value after 48 hours cure was between 800 and 900 psi, demonstrating that neutralized products prepared as in Jpn No. 78/113843 are not suitable for anaerobic primer compositions.

EXAMPLE 6

To determine whether degree of neutralization significantly affected the adhesion properties of the inventive primers, a solution of 0.61 g PM-2 in 100 mls 1,1,1-trichloroethane was prepared and to separate aliquots of this solution were added sufficient Cu(AcAc)$_2$, Cu(2-ethylhexanoate)$_2$ or CaCO$_3$ to effect the various degrees of neutralization shown in Table V. Adhesive cure on steel lapshear coupons was as in Example 1. The results in Table V demonstrate that degree of neutralization is not critical and that calcium/acid phosphate monomer salts are not suitable for use as adhesion promoting activators for anaerobic compositions.

TABLE V

EFFECT OF DEGREE OF NEUTRALIZATION ON PERFORMANCE OF Cu(II) PM-2 AND Ca(II) PM-2

| PRIMER | TENSILE SHEAR STRENGTH (psi) Degree of Neutralization | | | | |
|---|---|---|---|---|---|
| | 100% | 75% | 50% | 25% | 0% |
| PM-2 + Cu(AcAc)$_2$ | 2500 | 2500 | 2800 | 2500 | 1600 |
| PM-2 + Cu (2-ethylhexanoate)$_2$ | 2500 | 2700 | 2700 | 2400 | 1800 |
| PM-2 + CaCO$_3$ | 1300 | 1300 | 1300 | 1600 | 1600 |

I claim:

1. In a method of curing a liquid composition on a substrate, the cureable composition comprising a mixture of at least one (meth)acrylic, an effective amount of an monomer accelerator and a peroxy initiator, and the method comprising applying a solution of a cure activator in a volatile organic solvent to the substrate surface and allowing the activator solvent to evaporate, subsequently applying the curable composition to the substrate surface and allowing the composition to cure, the improvement comprising that the activator solution comprises a solution in a volatile organic solvent of a salt of a metal ion selected from Cu(II), Co(II), Mn(II) Mn(III) and Cr(III) and a counterion derived from a (meth)acrylic functional acid phosphate monomer.

2. The method of claim 1 where the acid phosphate monomer has the formula

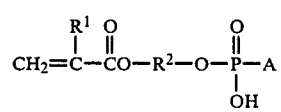

where R$^1$ is H or methyl, R$^2$ is a divalent organic residue having from 2–40 carbon atoms and A is OH or —O—R$^2$—OOC—C(R$^1$)=CH$_2$.

3. The method of claim 2 wherein $R^2$ is selected from $C_2$-$C_{10}$ alkylene groups.

4. A bonding method of claim 1 wherein the method further comprises applying a second substrate to the first substrate after or at the same time as the cureable composition applying step and before the composition is cured, and maintaining the two said substrates in joined relationship until the cureable composition has cured.

5. The method of claim 1 wherein the substrate has a zinc surface.

6. The method of claim 1 wherein the substrate has an aluminum surface.

7. The method of claim 1 where the metal ion is selected from Cu(II), Co(II) and Cr(III).

8. The method of claim 2 where the metal ion is Cu(II).

9. A method as in claim 1 wherein the activator solution consists essentially of said (meth)acrylic functional acid phosphate monomer salt solution.

* * * * *